(12) United States Patent
Hu et al.

(10) Patent No.: US 9,622,175 B2
(45) Date of Patent: Apr. 11, 2017

(54) METHOD FOR IMPLEMENTING DISCONTINUOUS RECEPTION AND BASE STATION

(71) Applicant: CHINA MOBILE COMMUNICATIONS CORPORATION, Beijing (CN)

(72) Inventors: Nan Hu, Beijing (CN); Youjun Gao, Beijing (CN); Chunfeng Cui, Beijing (CN)

(73) Assignee: CHINA MOBILE COMMUNICATIONS CORPORATION, Beijing (CN)

( * ) Notice: Subject to any disclaimer, the term of this patent is extended or adjusted under 35 U.S.C. 154(b) by 0 days.

(21) Appl. No.: 14/418,694

(22) PCT Filed: Jul. 26, 2013

(86) PCT No.: PCT/CN2013/080213
§ 371 (c)(1),
(2) Date: Jan. 30, 2015

(87) PCT Pub. No.: WO2014/019476
PCT Pub. Date: Feb. 6, 2014

(65) Prior Publication Data
US 2015/0189590 A1    Jul. 2, 2015

(30) Foreign Application Priority Data

Aug. 2, 2012  (CN) .......................... 2012 1 0274065

(51) Int. Cl.
*G08C 17/00* (2006.01)
*H04W 52/02* (2009.01)
(Continued)

(52) U.S. Cl.
CPC ......... *H04W 52/0212* (2013.01); *H04W 8/08* (2013.01); *H04W 52/0235* (2013.01); *H04W 76/048* (2013.01); *H04W 8/24* (2013.01)

(58) Field of Classification Search
CPC ........... H04W 76/048; H04W 52/0216; H04W 72/042; H04W 76/046; H04W 88/02;
(Continued)

(56) References Cited

U.S. PATENT DOCUMENTS

2012/0320791 A1* 12/2012 Guo .................. H04W 52/0212
                                                                370/254
2015/0172969 A1*  6/2015 Sebire ............... H04W 36/0016
                                                                370/331

(Continued)

FOREIGN PATENT DOCUMENTS

CN      102143541 A      8/2001
CN      101352093 A      1/2009
(Continued)

OTHER PUBLICATIONS

Office Action dated Feb. 1, 2016 issued in corresponding Chinese Application No. 201210274065.6.
(Continued)

*Primary Examiner* — Michael J Moore, Jr.
(74) *Attorney, Agent, or Firm* — Nath, Goldberg & Meyer; Jerald L. Meyer

(57) ABSTRACT

The present disclosure relates to the field of mobile communication technology, and provides a method for implementing discontinuous reception and a base station. The method includes the steps of: receiving, by a first base station, a discontinuous reception DRX configuration recommendation reported by UE; and transmitting, by the first base station, the DRX configuration recommendation or DRX configuration parameters configured by the first base
(Continued)

station for the UE in accordance with the DRX configuration recommendation to a second base station when the UE is switched from the first base station to the second base station.

16 Claims, 5 Drawing Sheets

(51) Int. Cl.
*H04W 76/04* (2009.01)
*H04W 8/08* (2009.01)
*H04W 8/24* (2009.01)

(58) Field of Classification Search
CPC .............. H04W 72/0413; H04W 88/08; H04W 72/0406; Y02B 60/50
See application file for complete search history.

(56) References Cited

U.S. PATENT DOCUMENTS

| 2015/0189493 | A1* | 7/2015 | Lee ...................... | H04W 76/02 370/329 |
| 2015/0201375 | A1* | 7/2015 | Vannithamby ........ | H04W 24/04 370/311 |
| 2015/0208288 | A1* | 7/2015 | Fu ..................... | H04W 36/0055 370/331 |
| 2015/0257049 | A1* | 9/2015 | Yavuz ..................... | H04W 8/20 455/436 |

FOREIGN PATENT DOCUMENTS

| CN | 101553022 A | 10/2009 |
| CN | 101931890 A | 12/2010 |
| WO | 2009/023470 A2 | 2/2009 |

OTHER PUBLICATIONS

International Search Report and Written Opinion dated Oct. 31, 2013 issued in corresponding International Application No. PCT/CN2013/080213.
3GPP TS 36.331, 3rd Generation Partnership Project, Technical Specification Group Radio Access Network, Evolved Universal Terrestrial Radio Access, Radio Resource Control, Protocol specification, V10.0.0, Dec. 2010.
2nd Office Action issued in corresponding Chinese Application No. 201210274065.6 dated Aug. 8, 2016.

* cited by examiner

METHOD FOR IMPLEMENTING DISCONTINUOUS RECEPTION AND BASE STATION

CROSS-REFERENCE TO RELATED APPLICATION

The present application is the U.S. national phase of PCT Application No. PCT/CN2013/080213 filed on Jul. 26, 2013, which claims a priority of the Chinese patent application No. 201210274065.6 filed on Aug. 2, 2012 before the SIPO and entitled "method for implementing discontinuous reception and base station", which is incorporated herein by reference in its entirety.

TECHNICAL FIELD

The present disclosure relates to the field of wireless communication, in particular to a method for implementing discontinuous reception and a base station.

BACKGROUND

Along with the wide application of smart phones and the rapid development of mobile Internet services, a great impact or influence has been brought on a wireless network. A mobile phone QQ service, as a typical mobile Internet service, is growing rapidly, and according to official statistics, the mobile phone QQ has currently 200 million registered users, including 100 million active users and 20 million users being online at the same time. For the QQ service, there are many control messages, a user equipment (UE) status is updated frequently, a single data packet is of a small data volume, and UE interacts with a base station frequently. In the mobile Internet services, the UE will create or release resources frequently, and the data volume to be transmitted for each resource connection is very small, resulting in a severe influence on air interfaces. Hence, it is required to study and optimize a future network with respect to service characteristics of the mobile Internet, so as to match the service characteristics more efficiently.

In this regard, Enhancements for diverse data applications (eDDA) have been introduced into the 3GPP Long Term Evolution Release 11 (LTE R11), which focuses on the enhancements of optimal designs of the mobile Internet services and the power consumption of the terminal. In the discussion of LTE R11 eDDA, the following optimization solution has been agreed.

When the UE activates the mobile Internet service, it informs the network of its discontinuous reception (DRX) configuration recommendation through Radio Resource Control (RRC) signaling or Media Access Control (MAC) signaling. The DRX configuration recommendation includes a default recommendation or a power-saving recommendation. For example, the UE reports the power-saving recommendation to the network, and then the network configures corresponding DRX parameters for the UE, so that the UE is switched from a default state to a power-saving state. DRX is adopted so as to provide a power-saving function to the UE in a RRC connection state for a long period of time. With a DRX mechanism, the UE is merely required to detect a downlink physical control channel at certain times, and at the other times it may be in a sleep state.

For the optimization of the Internet services, the RRC connection to the UE may be maintained at a network side for a long period of time, so as to prevent continuous occupation of access resources at the UE due to the frequent transmission of small data packets. Accordingly, it is required to configure the DRX mechanism with a long sleep period for the UE, so as to enable the UE to be in the power-saving state. Once the UE activates the mobile Internet services, it will report the creation of its DRX configuration to the network, and after the network configures the corresponding DRX parameters for it, the UE enters a power-saving mode.

However, this solution does not take the mobility of the UE into consideration. When the UE is switched from one base station to another, it needs to report whether or it is in the power-saving state to this base station again, resulting in not only an increase in the air-interface signaling overhead but also additional control signaling overhead due to the delayed report. In addition, it is not all the base stations and the UE that can support the eDDA optimization function. According to the existing solution, the UE may transmit the signaling indicating that it can enter the power-saving mode to the base station that does not support the eDDA optimization solution. At this time, the base station cannot identify this signaling, and meaningless air-interface signaling overhead will occur. Further, erroneous judgment may be made by the base station or the UE, thus the additional signaling overhead will occur.

SUMMARY

An object of the present disclosure is to provide a method for implementing discontinuous reception and a base station, so as to reduce the air-interface signaling overhead.

In one aspect, the present disclosure provides a method for implementing discontinuous reception, including the steps of:

receiving, by a first base station, a discontinuous reception DRX configuration recommendation reported by UE; and transmitting, by the first base station, the DRX configuration recommendation or DRX configuration parameters configured by the first base station for the UE in accordance with the DRX configuration recommendation to a second base station when the UE is switched from the first base station to the second base station.

The method further includes the steps of:

receiving, by the first base station, capability information reported by the UE about whether or not the UE supports Enhancements for diverse data applications eDDA optimization; and transmitting, by the first base station, information about allowance of reporting the DRX configuration recommendation to the UE when it is determined that the UE supports the eDDA optimization in accordance with the capability information.

The step of receiving, by the first base station, the capability information reported by the UE about whether or not the UE supports the eDDA optimization includes:

receiving, by the first base station, the capability information reported by the UE about whether or not the UE supports the eDDA optimization during attachment or tracking area updating.

The step of transmitting, by the first base station, the information about allowance of reporting the DRX configuration recommendation to the UE includes:

transmitting, by the first base station, the information about allowance of reporting the DRX configuration recommendation to the UE through Radio Resource Control RRC reconfiguration signaling.

The step of receiving, by the first base station, the DRX configuration recommendation reported by the UE includes:

receiving, by the first base station, the DRX configuration recommendation reported by the UE when the UE activates an Internet service.

The step of transmitting, by the first base station, the DRX configuration recommendation or the DRX configuration parameters configured by the first base station for the UE in accordance with the DRX configuration recommendation to the second base station includes:

transmitting, by the first base station, the DRX configuration recommendation or the DRX configuration parameters of the UE to the second base station through handover preparation information in RRC signaling.

In another aspect, the present disclosure provides a method for implementing discontinuous reception, including the steps of:

receiving, by a first base station, capability information reported by UE about whether or not the UE supports Enhancements for diverse data applications eDDA optimization; and transmitting, by the first base station, information about allowance of reporting a DRX configuration recommendation to the UE.

The step of receiving, by the first base station, the capability information reported by the UE about whether or not the UE supports the eDDA optimization includes:

receiving, by the first base station, the capability information reported by the UE about whether or not the UE supports the eDDA optimization during attachment or tracking area updating.

The step of transmitting, by the first base station, the information about allowance of reporting the DRX configuration recommendation to the UE includes:

transmitting, by the first base station, the information about allowance of reporting the DRX configuration recommendation to the UE through Radio Resource Control RRC reconfiguration signaling.

In yet another aspect, the present disclosure provides a base station, including:

a first reception module configured to receive a discontinuous reception DRX configuration recommendation reported by UE; and a first transmission module configured to transmit the DRX configuration recommendation or DRX configuration parameters configured by the base station for the UE in accordance with the DRX configuration recommendation to a second base station when the UE is switched from the base station to the second base station.

The base station further includes:

a second reception module configured to receive capability information reported by the UE about whether or not the UE supports Enhancements for diverse data applications eDDA optimization; and a second transmission module configured to transmit information about allowance of reporting the DRX configuration recommendation to the UE when it is determined that the UE supports the eDDA optimization in accordance with the capability information.

The second reception module is specifically configured to receive the capability information reported by the UE about whether or not the UE supports the eDDA optimization during attachment or tracking area updating.

The second transmission module is specifically configured to transmit the information about allowance of reporting the DRX configuration recommendation to the UE through Radio Resource Control RRC reconfiguration signaling.

The first reception module is specifically configured to receive the DRX configuration recommendation reported by the UE when the UE activates an Internet service.

The first transmission module is specifically configured to transmit the DRX configuration recommendation or the DRX configuration parameters of the UE to the second base station through handover preparation information in RRC signaling.

In still yet another aspect, the present disclosure provides a base station, including:

a second reception module configured to receive capability information reported by UE about whether or not the UE supports Enhancements for diverse data applications eDDA optimization; and a second transmission module configured to transmit information about allowance of reporting a DRX configuration recommendation to the UE.

The second reception module is specifically configured to receive the capability information reported by the UE about whether or not it supports the eDDA optimization during attachment or tracking area updating.

The second transmission module is specifically configured to transmit the information about allowance of reporting the DRX configuration recommendation to the UE through Radio Resource Control RRC reconfiguration signaling.

As compared with the prior art, according to one technical solution of the present disclosure, the mobility of the UE is taken into consideration. When the UE is switched from the first base station to the second base station, the first base station transmits the DRX configuration recommendation reported by the UE or the DRX parameters configured for the UE in accordance with the DRX configuration recommendation to the second base station, so that it is unnecessary for the UE to report the DRX configuration recommendation to the base station again. As a result, it is able to reduce the air-interface signaling overhead, and ensure that the second base station can acquire the DRX configuration recommendation or the DRX parameters of the UE timely.

According to another technical solution of the present disclosure, the UE further reports the capability information about whether or not it supports the eDDA optimization to the base station, and the DRX configuration recommendation will be reported only when the UE receives from the base station the information about allowance of the DRX configuration recommendation. As a result, it is able to prevent the meaningless air-interface signaling overhead.

DETAILED DESCRIPTION

In order to make the objects, the technical solutions and the advantages of the present disclosure more apparent, the present disclosure will be described hereinafter in conjunction with the drawings and embodiments.

Figure 1:
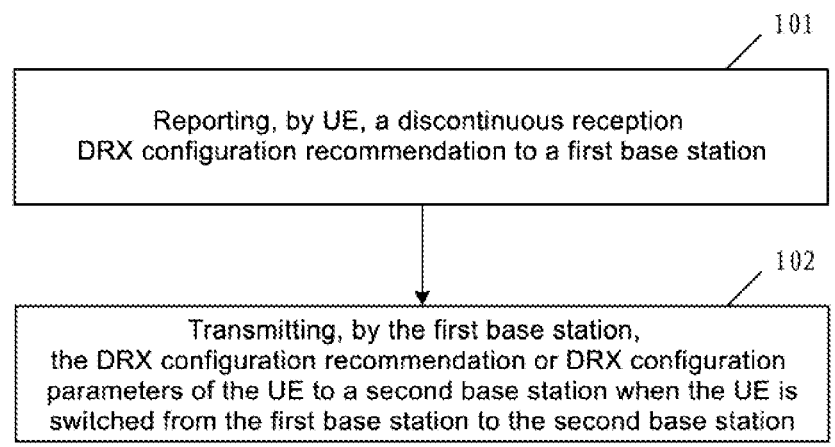
FIG. 1 is a flow chart of a method for implementing discontinuous reception according to the first embodiment of the present disclosure.

Referring to FIG. 1, which is a flow chart of a method for implementing discontinuous reception according to the first embodiment of the present disclosure, the method includes the following steps.

Step 101: reporting, by UE, a discontinuous reception DRX configuration recommendation to a first base station.

The UE may report its DRX configuration recommendation to the first base station when it activates a mobile Internet service. The DRX configuration recommendation includes a default recommendation or a power-saving recommendation. For example, the UE reports the power-saving recommendation to the base station, and after the base station configures corresponding DRX parameters for the UE, the UE is switched from a default state to a power-saving state. After the first base station receives the DRX configuration recommendation, it may configure the corresponding DRX parameters for the UE in accordance with the DRX configuration recommendation, so as to obtain the DRX configuration parameters of the UE.

Step 102: transmitting, by the first base station, the DRX configuration recommendation or the DRX configuration parameters of the UE to a second base station when the UE is switched from the first base station to the second base station.

The first base station may transmit the DRX configuration recommendation or the DRX configuration parameters of the UE to the second base station through handover preparation information in RRC signaling. When both the first base station and the second base station are eNBs, the handover preparation information may be transmitted through an X2 interface between the first base station and the second base station. If there is no X2 interface therebetween, the first base station may inform a Mobile Management Entity (MME) of the handover preparation information through a S1 interface, and then the MME may inform the second base station of the handover preparation information through the S1 interface.

Figure 2:
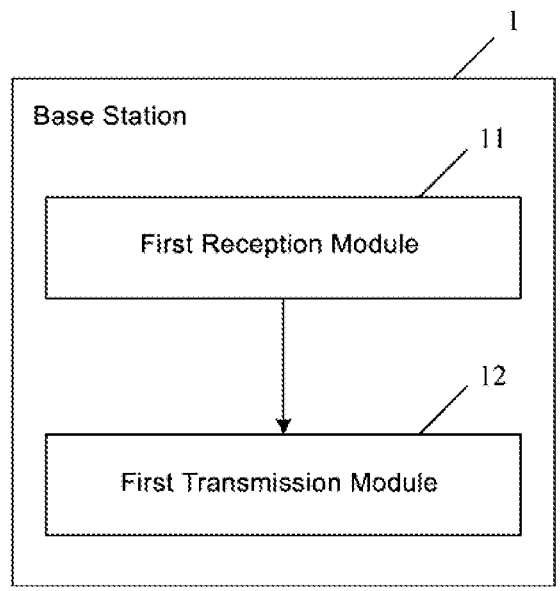
FIG. 2 is a schematic view showing a base station according to the first embodiment of the present disclosure.

Correspondingly, the present disclosure further provides a base station in this embodiment. Referring to FIG. 2, which is a schematic view showing the base station according to the first embodiment of the present disclosure, the base station 1 includes:

a first reception module 11 configured to receive the DRX configuration recommendation reported by the UE; and a first transmission module 12 configured to transmit the DRX configuration recommendation or the DRX configuration parameters of the UE to the second base station when the UE is switched from the base station to the second base station.

After the first reception module 11 receives the DRX configuration recommendation, it may configure the corresponding DRX parameters for the UE in accordance with the DRX configuration recommendation, so as to obtain the DRX configuration parameters of the UE. The DRX configuration recommendation includes a default recommendation or a power-saving recommendation.

The first reception module 11 is specifically configured to receive the DRX configuration recommendation reported by the UE when the UE activates the Internet service.

The first transmission module 12 is specifically configured to transmit the DRX configuration recommendation or the DRX configuration parameters of the UE to the second base station through the handover preparation information in the RRC signaling.

In the first embodiment, when the UE is switched from the first base station to the second base station, the first base station transmits the DRX configuration recommendation reported by the UE or the DRX parameters configured for the UE in accordance with the DRX configuration recommendation to the second base station, so that it is unnecessary for the UE to report the DRX configuration recommendation to the second base station again. As a result, it is able to reduce the air-interface signaling overhead, and ensure that the second base station can acquire the DRX configuration recommendation or the DRX parameters of the UE timely.

Figure 3:
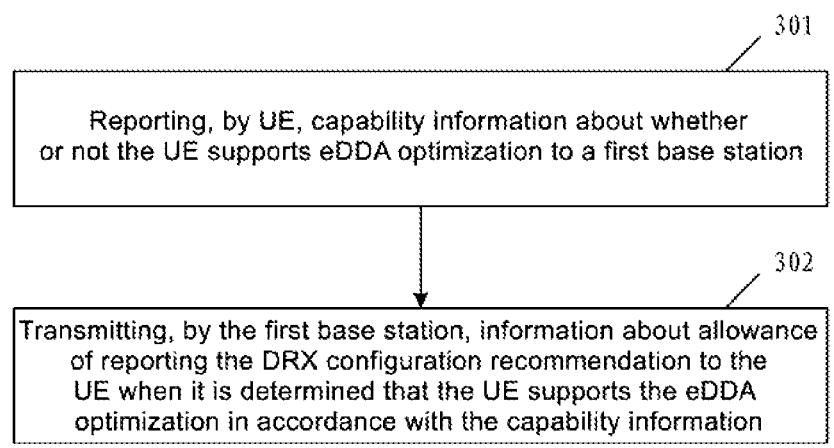
FIG. 3 is a flow chart of the method for implementing discontinuous reception according to the second embodiment of the present disclosure.

Referring to FIG. 3, which is a flow chart of the method for implementing discontinuous reception according to the second embodiment, the method includes the following steps.

Step 301: reporting, by the UE, capability information about whether or not it supports the eDDA optimization to the first base station.

The UE may report the capability information about whether or not it supports the eDDA optimization to the first base station during the attachment or tracking area updating (TAU), i.e., it may report to the first base station the information about whether or not it has the capability of reporting its DRX configuration recommendation.

A one-bit flag may be added to an existing information element (IE) UE-EUTRA-Capability so as to identify whether or not the UE supports the eDDA optimization, i.e., the capability information about whether or not the UE supports the eDDA optimization may be carried by the one-bit flag in UE-EUTRA-Capability.

Step 302: transmitting, by the first base station, the information about allowance of reporting the DRX configuration recommendation to the UE when it is determined that the UE supports the eDDA optimization in accordance with the capability information.

The first base station may transmit the information about allowance of reporting the DRX configuration recommendation to the UE through the RRC reconfiguration signaling. Of course, if the first base station does not support the eDDA optimization, it may not transmit the information about allowance of reporting the DRX configuration recommendation to the UE.

Figure 4:
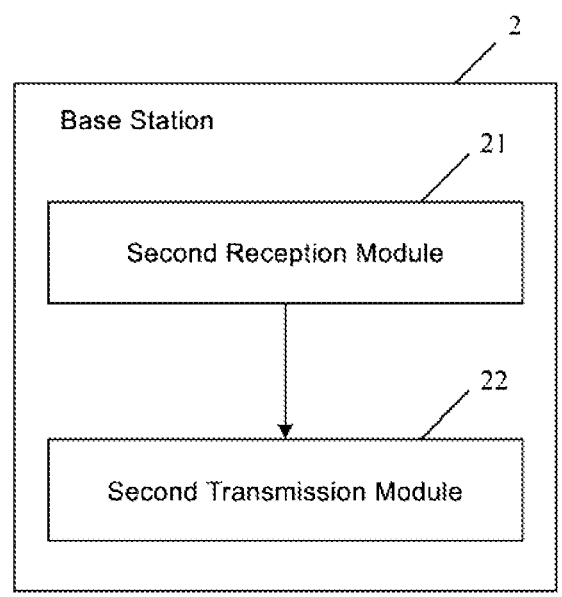
FIG. 4 is a schematic view showing the base station according to the second embodiment of the present disclosure.

Correspondingly, the present disclosure further provides a base station in this embodiment. Referring to FIG. 4, which is a schematic view showing the base station in the second embodiment, the base station 2 includes:

a second reception module 21 configured to receive the capability information reported by the UE about whether or not it supports the eDDA optimization; and a second transmission module 22 configured to transmit the information about allowance of reporting the DRX configuration recommendation to the UE when it is determined that the UE supports the eDDA optimization in accordance with the capability information.

The second reception module 21 is specifically configured to receive the capability information reported by the UE about whether or not it supports the eDDA optimization during the attachment or tracking area updating.

The second transmission module 22 is specifically configured to transmit the information about allowance of reporting the DRX configuration recommendation to the UE through the RRC reconfiguration signaling.

In the second embodiment, the UE further reports to the base station the capability information about whether or not it supports the eDDA optimization, and the DRX configuration recommendation is reported only when the UE receives from the base station the information about allowance of reporting the DRX configuration recommendation. As a result, it is able to prevent the meaningless air-interface signaling overhead.

Figure 5:
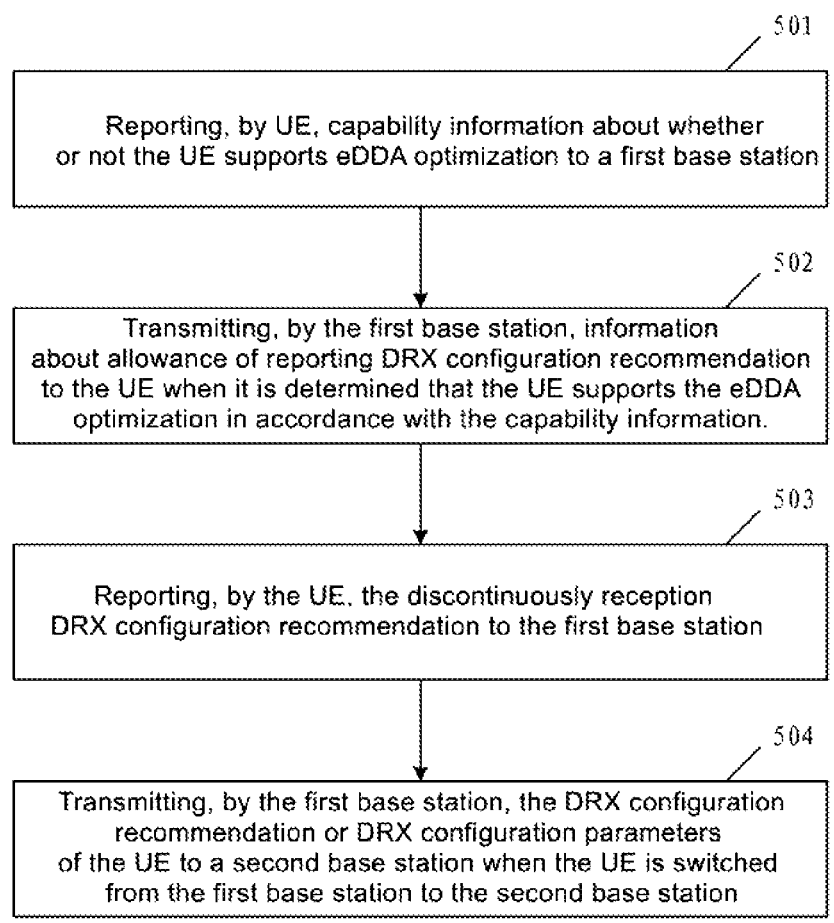
FIG. 5 is a flow chart of the method for implementing discontinuous reception according to the third embodiment of the present disclosure.

Referring to FIG. 5, which is a flow chart of the method for implementing discontinuous reception according to the third embodiment of the present disclosure, the method includes the following steps.

Step 501: reporting, by the UE, the capability information about whether or not it supports the eDDA optimization to the first base station.

The UE may report to the first base station the capability information about whether or not it supports the eDDA optimization during the attachment or tracking area updating, i.e., it may report to the first base station the information about whether or not it has the capability of reporting the DRX configuration recommendation.

A one-bit flag may be added to the existing information element (IE) UE-EUTRA-Capability so as to identify whether or not the UE supports the eDDA optimization, i.e., the capability information about whether or not the UE supports the eDDA optimization may be carried by the one-bit flag in UE-EUTRA-Capability.

Step 502: transmitting, by the first base station, the information about allowance of reporting the DRX configuration recommendation to the UE when it is determined that the UE supports the eDDA optimization in accordance with the capability information.

The first base station may transmit the information about allowance of reporting the DRX configuration recommendation to the UE through the RRC reconfiguration signaling. Of course, if the first base station does not support the eDDA optimization, it may not transmit the information about allowance of reporting the DRX configuration recommendation to the UE.

Step 503: reporting, by the terminal, the discontinuous reception DRX configuration recommendation to the first base station.

The UE may report its DRX configuration recommendation to the first base station when it activates a mobile Internet service. The DRX configuration recommendation includes a default recommendation or a power-saving recommendation. For example, the UE reports the power-saving recommendation to the base station, and after the base station configures corresponding DRX parameters for the UE, the UE is switched from the default state to the power-saving state. After the first base station receives the DRX configuration recommendation, it may configure the corresponding DRX parameters for the UE in accordance with the DRX configuration recommendation, so as to obtain the DRX configuration of the UE.

Step 504: transmitting, by the first base station, the DRX configuration recommendation or the DRX configuration parameters of the UE to the second base station when the UE is switched from the first base station to the second base station.

The first base station may transmit the DRX configuration recommendation or the DRX configuration parameters of the UE to the second base station through the handover preparation information in the RRC signaling. When both the first base station and the second base station are evolved Node Bs (eNB), the handover preparation information may be transmitted through an X2 interface between the first base station and the second base station. If there is no X2 interface between the first base station and the second base station, the first base station may inform a Mobile Management Entity (MME) of the handover preparation information through a S1 interface, and then the MME may inform the base station of the handover preparation information through the S1 interface.

Figure 6:
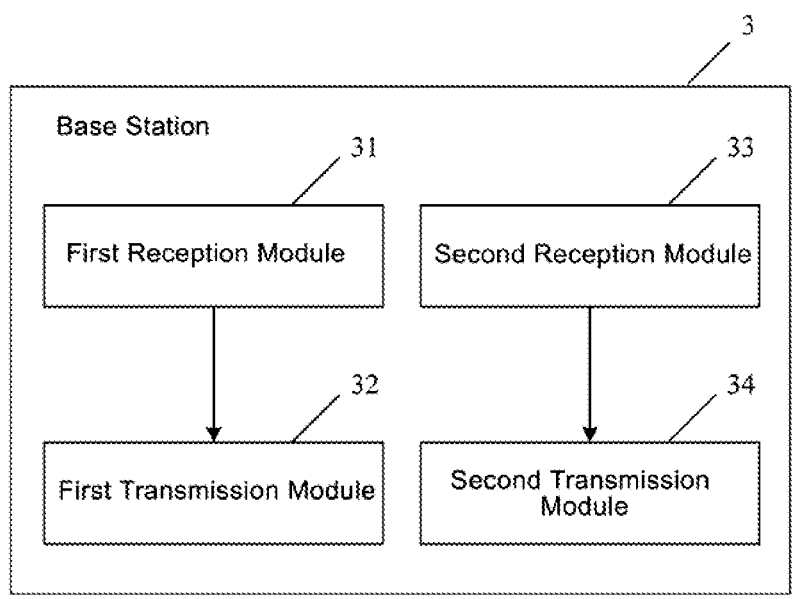
FIG. 6 is a schematic view showing the base station according to the third embodiment of the present disclosure.

Correspondingly, the present disclosure further provides a base station in this embodiment. Referring to FIG. 6, which is a schematic view showing the base station in the third embodiment, the base station 3 includes:

a first reception module 31 configured to receive the DRC configuration recommendation reported by the UE;

a first transmission module 32 configured to transmit the DRX configuration recommendation or the DRX configuration parameters of the UE to the second base station when the UE is switched from the base station to the second base station;

a second reception module 33 configured to receive the capability information reported by the UE about whether or not it supports the eDDA optimization; and a second transmission module 34 configured to transmit the information about allowance of reporting the DRX configuration recommendation to the UE when it is determined that the UE supports the eDDA optimization in accordance with the capability information.

After the first reception module 11 receives the DRX configuration recommendation, it may configure the corresponding DRX parameters for the UE in accordance with the DRX configuration recommendation, so as to obtain the DRX configuration of the UE. The DRX configuration recommendation includes the default recommendation or the power-saving recommendation.

The second reception module 33 is specifically configured to receive the capability information reported by the UE about whether or not it supports the eDDA optimization during the attachment or tracking area updating.

The second transmission module 34 is specifically configured to transmit the information about allowance of reporting the DRX configuration recommendation to the UE through the RRC reconfiguration signaling.

The first reception module 31 is specifically configured to receive the DRX configuration recommendation reported by the UE when it activates the Internet service.

The first transmission module 32 is specifically configured to transmit the DRX configuration recommendation or the DRX configuration parameters of the UE to the second base station through the handover preparation information in the RRC signaling.

In the third embodiment, when the UE is switched from the first base station to the second base station, the first base station transmits the DRX configuration recommendation reported by the UE or the DRX parameters configured for the UE in accordance with the DRX configuration recommendation to the second base station, so that it is unnecessary for the UE to report the DRX configuration recommendation to the base station again. As a result, it is able to reduce the air-interface signaling overhead, and ensure that the second base station can acquire the DRX configuration recommendation or the DRX parameters of the UE timely. Further, the UE reports to the base station the capability information about whether or not it supports the eDDA optimization, and the DRX configuration recommendation will be reported only when the UE receives from the base station the information about allowance of reporting the DRX configuration recommendation. As a result, it is able to prevent the meaningless air-interface signaling overhead.

The above embodiments are for illustrative purposes only, but shall not be used to limit the present disclosure. It should be appreciated that, a person skilled in the art may make further modifications or substitutions without departing from the spirit of the present disclosure, and these modifications or substitutions shall also fall within the scope of the appended claims.

What is claimed is:

1. A method for implementing discontinuous reception, comprising the steps of:
   receiving, by a first base station, a discontinuous reception DRX configuration recommendation reported by a UE; and
   transmitting, by the first base station, the DRX configuration recommendation or DRX configuration parameters configured by the first base station for the UE in accordance with the DRX configuration recommendation to a second base station when the UE is switched from the first base station to the second base station;
   wherein the method further comprises the steps of:
   receiving, by the first base station, capability information reported by the UE about whether or not the UE supports Enhancements for diverse data applications eDDA optimization; and
   transmitting, by the first base station, information about allowance of reporting the DRX configuration recommendation to the UE when the first base station supports the eDDA optimization and determines that the UE supports the eDDA optimization in accordance with the capability information.

2. The method according to claim 1, wherein the step of receiving, by the first base station, the capability information reported by the UE about whether or not the UE supports the eDDA optimization comprises:
   receiving, by the first base station, the capability information reported by the UE about whether or not the UE supports the eDDA optimization during attachment or tracking area updating.

3. The method according to claim 2, wherein the capability information about whether or not the UE supports the eDDA optimization is carried by a one-bit flag in UE-EUTRA-Capability.

4. The method according to claim 1, wherein the step of transmitting, by the first base station, the information about allowance of reporting the DRX configuration recommendation to the UE comprises:
   transmitting, by the first base station, the information about allowance of reporting the DRX configuration recommendation to the UE through Radio Resource Control RRC reconfiguration signaling.

5. The method according to claim 1, wherein the step of receiving, by the first base station, the DRX configuration recommendation reported by the UE comprises:
   receiving, by the first base station, the DRX configuration recommendation reported by the UE when the UE activates an Internet service.

6. The method according to claim 1, wherein the step of transmitting, by the first base station, the DRX configuration recommendation or the DRX configuration parameters configured by the first base station for the UE in accordance with the DRX configuration recommendation to the second base station comprises:
   transmitting, by the first base station, the DRX configuration recommendation or the DRX configuration parameters configured by the first base station for the UE in accordance with the DRX configuration recommendation to the second base station through handover preparation information in RRC signaling.

7. A method for implementing discontinuous reception, comprising the steps of:
   receiving, by a first base station, capability information reported by a UE about whether or not the UE supports Enhancements for diverse data applications eDDA optimization; and
   transmitting, by the first base station, information about allowance of reporting a DRX configuration recommendation to the UE;
   wherein the step of transmitting, by the first base station, the information about allowance of reporting the DRX configuration recommendation to the UE comprises:
   transmitting, by the first base station, the information about allowance of reporting the DRX configuration recommendation to the UE when the first base station supports the eDDA optimization and determines that the UE supports the eDDA optimization in accordance with the capability information.

8. The method according to claim 7, wherein the step of receiving, by the first base station, the capability information reported by the UE about whether or not the UE supports the eDDA optimization comprises:
   receiving, by the first base station, the capability information reported by the UE about whether or not the UE supports the eDDA optimization during attachment or tracking area updating.

9. The method according to claim 8, wherein the capability information about whether or not the UE supports the eDDA optimization is carried by a one-bit flag in UE-EUTRA-Capability.

10. The method according to claim 7, wherein the step of transmitting, by the first base station, the information about allowance of reporting the DRX configuration recommendation to the UE comprises:
    transmitting, by the first base station, the information about allowance of reporting the DRX configuration recommendation to the UE through Radio Resource Control RRC reconfiguration signaling.

11. A base station, comprising:
    a first reception module configured to receive a discontinuous reception DRX configuration recommendation reported by a UE; and
    a first transmission module configured to transmit the DRX configuration recommendation or DRX configuration parameters configured by the base station for the UE in accordance with the DRX configuration recommendation to a second base station when the UE is switched from the base station to the second base station;
    wherein the base station further comprises:
    a second reception module configured to receive capability information reported by the UE about whether or not the UE supports Enhancements for diverse data applications eDDA optimization; and
    a second transmission module configured to transmit information about allowance of reporting the DRX configuration recommendation to the UE when the base station supports the eDDA optimization and determines that the UE supports the eDDA optimization in accordance with the capability information.

12. The base station according to claim 11, wherein the second reception module is specifically configured to receive the capability information reported by the UE about whether or not the UE supports the eDDA optimization during attachment or tracking area updating.

13. The base station according to claim 12, wherein the capability information about whether or not the UE supports the eDDA optimization is carried by a one-bit flag in UE-EUTRA-Capability.

14. The base station according to claim 11, wherein the second transmission module is specifically configured to transmit the information about allowance of reporting the DRX configuration recommendation to the UE through Radio Resource Control RRC reconfiguration signaling.

15. A base station, comprising:
- a second reception module configured to receive capability information reported by a UE about whether or not the UE supports Enhancements for diverse data applications eDDA optimization; and
- a second transmission module configured to transmit information about allowance of reporting a DRX configuration recommendation to the UE;
- wherein the second transmission module is specifically configured to transmit the information about allowance of reporting the DRX configuration recommendation to the UE when the base station supports the eDDA optimization and determines the UE supports the eDDA optimization in accordance with the capability information.

16. The base station according to claim 15, wherein the second reception module is specifically configured to receive the capability information reported by the UE about whether or not the UE supports the eDDA optimization during attachment or tracking area updating.

* * * * *